June 28, 1960

J. KUHN 2,942,347

APPARATUS FOR READING AND MEASURING FILM IMAGES

Filed April 27, 1956

Jacob Kuhn INVENTOR.

BY

Attorney

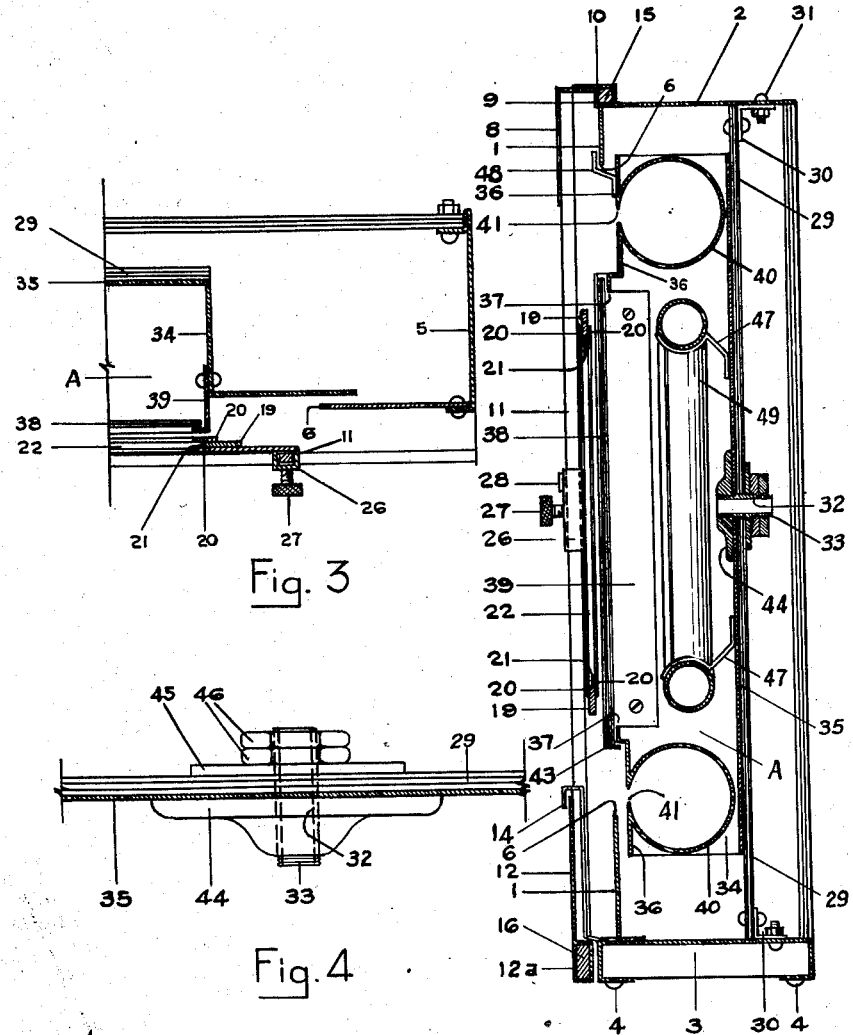

June 28, 1960  J. KUHN  2,942,347
APPARATUS FOR READING AND MEASURING FILM IMAGES
Filed April 27, 1956  3 Sheets-Sheet 3

Jacob Kuhn INVENTOR.
BY

United States Patent Office 2,942,347
Patented June 28, 1960

2,942,347
APPARATUS FOR READING AND MEASURING FILM IMAGES

Jacob Kuhn, 105½ S. Court St., Florence, Ala.

Filed Apr. 27, 1956, Ser. No. 581,060

5 Claims. (Cl. 33—78)

This invention relates to measuring devices, and it deals more specifically with an apparatus for reading and measuring images on film, such as those produced on photographic negatives, or more particularly the images registered on X-ray film.

A pronounced increase during the past decade in the use of X-ray for diagnostic purposes, for example, in determining the causes of bodily malfunction, the effects of trauma, and the prescription of therapy for corrective purposes, has made it apparent that there is a great need for better apparatus than heretofore available for scientifically reading film images.

Every medical technician, physician and therapist is all too familiar with the conventional means for X-ray images now in general use by the profession. Most predominant is the horizontal or vertical light box, comprising a box having a light source within, with one face of the box constructed of frosted glass, and pinch clamps positioned around the box to hold the film in place against the surface of the frosted screen. The viewer can attempt measurements in an awkward manner with a ruler on the vertical surface or with the light box in a horizontal position. On the other hand, he can use the device which is the subject of my U.S. Patent No. 2,110,087, an instrument which may be attached to the face of the box in a rigid position and provide more accuracy in measurement. However, this former invention, which provides movable scales, is limited in its application to a fixed or rigid light box, and does not make provision for the use of different or varied sizes of film, nor does it provide a composite unit.

Much of the diagnostic procedure involved in X-ray also involves comparative study of several pictures at the same time, and in at least one field exact measurement of image location is of paramount importance. Particular reference is made to the science of chiropractic, and the method of chiropractic adjustment of articulations of the spinal column to correct the occurrence of subluxations therein, especially in the upper cervical region. After X-ray spinographs of the patient have been taken, it is necessary to determine the location, extent and nature of any subluxation, before any adjustment can be made for correction. To this end very exact measurements and comparison with normal anatomical structure is necessary.

Since the horizontal position for X-ray study is not suited to accommodation of the required distance from the eye of the viewer to enable comparative study of one film with another so mounted, it is obvious that some provision should be made for study in the more normal vertical position, wherein, simultaneously very accurate measurements may be made using the various sizes of film, in a composite, portable unit.

The present invention is an improvement over my U.S. Patent No. 2,110,087; and a primary object is to provide a measuring and reading instrument particularly adapted to use in the normal vertical position, and one which forms a composite, integral light-box and measuring unit further adapted to use with varied sizes of X-ray film.

A further object of the invention is to provide in such a unit one which is portable and simple in design, requiring fewer machined parts, more rugged in construction, and economical to manufacture. Other and further objects of my invention, together with the features of novelty, will appear in the course of the following description.

In the accompanying drawings which form a part of the specification and are to be read in conjunction therewith, and in which like reference numerals are used to indicate like parts in the various views:

Fig. 2 is a sectional view taken along the line 2—2 of Fig. 1 in the direction of the arrows, enlarged.

Fig. 3 is a fragmentary sectional view taken along the lines 3—3 in Fig. 1 in the direction of the arrows.

Fig. 4 is a fragmentary enlarged portion of the sectional view of Fig. 2, showing the pivotal mounting of the light-box.

Fig. 5 is a fragmentary sectional view of the bracket means for holding a film in position on the light-box, together with the adaptation for handling the over-hang of the end of a film.

Figure 6:
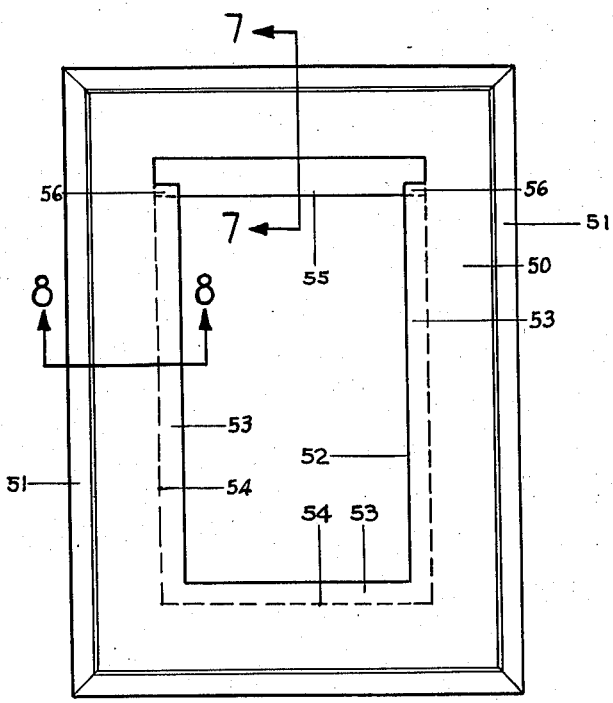

Fig. 6, an elevation view of a mask plate for adaptation of the light-box to the use of smaller sizes of film.

Figure 7:
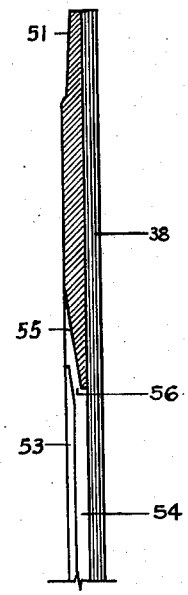

Fig. 7 is a sectional view taken along the lines 7—7 of Fig. 6 in the direction of the arrows.

Figure 8:
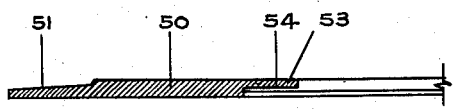

Fig. 8 is a sectional view taken along the lines 8—8 of Fig. 6 in the direction of the arrows.

Figure 1:
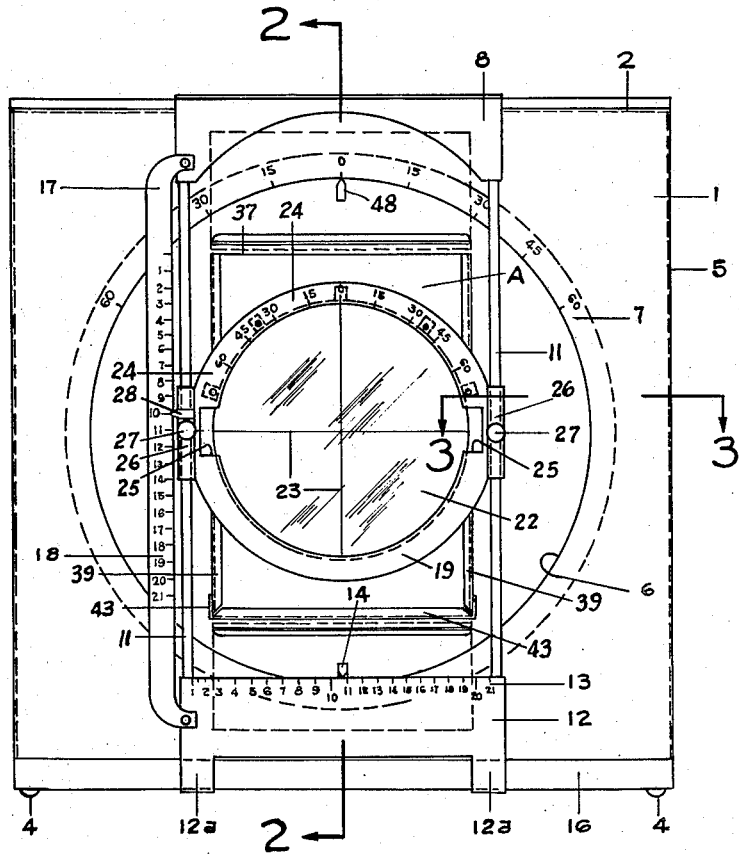
Fig. 1 is a front elevation view of the housing and frame constituting the composite light box and measuring unit of the invention.

Referring more particularly to the drawings, and specifically, first, to Fig. 1, the housing for the instrument comprises a box, formed of sheet aluminum or other suitable material, having a face 1, a top panel 2, a base piece 3 downwardly formed with feet 4, and side panels 5, all of which may be secured together by means of bolts, as indicated, or permanently welded, forming a box open in the rear. The face 1 of the housing box is provided in the embodiment shown with a centrally disposed circular aperture 6 having around its periphery a degree scale 7.

Referring to Fig. 1 and Fig. 2, superposed over the aperture 6 in the face panel 1 on the housing is a vertical frame comprising an upper flange member 8 having an inwardly turned and downwardly bent flange 9 to which is welded a laterally spaced flange 10, vertical supporting rods 11 to which are attached at the lower end a flange member 12 having its lower edge reversely bent to form a loop 12a, and having on its upper edge a marked degree scale 13. A suitable pointer 14 is affixed to the base 3 of the housing in register with the scale 13 as shown. The vertical frame is attached to the housing and movable laterally thereon by means of a track bar 15 secured to the top 2 of the housing and adapted to be received by the channel formed between the flanges 9 and 10. The vertical frame can thus be moved freely laterally on the housing along the bar 15. The lower flange member 12, as indicated in Fig. 2, is supported, and retains the vertical frame in position against the housing, by means of a bar 16 which is attached at each end to the base, and is received by the loops 12a of said member. Attached also to the vertical frame member, adjacent to one of the supporting rods 11, is a vertical beam 17, as shown in Fig. 1, having on its inner edge a scale 18.

Slidably mounted on the vertical supporting rods 11 is a dial ring 19 provided with inner and outer semi-rings 20 bolted thereto and forming a channel 21 adapted to receive a circular glass sight panel 22. The sight panel is provided with crossed hair-line 23 adapted to register with a scale 24 on the inner periphery of the ring as shown.

This sight panel is loosely, rotatably mounted in the channel 21 of the dial ring such that the panel may be moved in rotation by means of access to the edge of the panel through slots 25 in the edges of the ring adjacent the vertical rods 11. The dial ring 19 is itself secured to the rods 11 by means of integrally formed channel clamps 26 having set screws 27 bearing on the surface of the rods. Thus the ring may be moved in vertical adjustment on the rods by loosening the set screws and tightening them in the desired position. On one of the clamps 26 there has been formed a pointer 28 which registers with the scale 18 for measuring vertical adjustment. Scale 18 is hence marked either in inches, millimeters or other appropriate measure for minute displacement.

Positioned within the housing and laterally spaced from the face 1, as shown in Fig. 2, is a back panel 29, which, in the embodiment illustrated, is of wooden multi-ply board, the panel being secured to the top 2 and base 3 of the housing by means of flanges 30 and bolts 31. By preference, the panel 29 does not extend across the entire width of the housing, but is of desired width centrally disposed in the housing for access to the inner portion of the housing around its lateral edges. The panel 29 is provided in its center with a circular aperture 32 adapted to receive a short section of partially threaded small bore pipe 33, as shown.

Adapted for use within the housing there has been provided a light box, generally identified as A, having open upper and lower ends in the embodiment illustrated, with side walls 34, outwardly bent as indicated to form a mask, as shown in Fig. 2, a rear wall 35 and a front wall 36. The outwardly bent side walls have attached thereto for their entire length, depending on the aperture desired, on each side at the forward edge an inwardly bent flange 39. Thus, with the terminal upper and lower edges of the front wall 36 there is formed in the forward face of the light box a rectangular opening 37 of appropriate size to accommodate, in the usual structure, an X-ray film of the dimensions, 14 inches by 17 inches, or the standard size. Superposed over the opening 37 is a frosted glass panel or screen 38 of approximately the same dimensions. This panel or screen is held in position with its upper and lower edges against the surfaces provided by the projection of the respective edges of the wall 36 defining the light box aperture, with the vertical flanges 39 encompassing the edges of the panel, as shown in Figs. 2 and 3.

To allow an overhang of film at each end of the light box, by means of a convolution of the wall 36, there has been formed at each end of the light box a cylindrical receptacle 40, having formed in its forward surface a lengthwise slit or slot 41, the same adapted to receive the overhanging edges of an X-ray film 42, as shown in Fig. 5.

As further shown in Figs. 1 and 5, in the modification shown herein, there is provided extending lengthwise across the lower end of the face of the light box and pivotally connected at each end thereof a displaceable bracket (bracket or flange) 43, which, with its upturned forward leg, in the forward normal position would serve to hold the lower edge of a standard size film 42, as well as the panel 38, in position on the light box. The bracket 43 is pivotally connected by vertical arms to the light box as shown in Fig. 5. On the other hand, partially displaced to the rear, bracket 43 allows the edge or overhang of a film to move downward and be received by the slits 41 and receptacle 40, as shown. The normal tendency of the film would be to roll in the receptacle, but it is anticipated that a core or roller of some appropriate size could be inserted in the cylinders at each end of the box to assist in starting the film to roll.

The light box itself is pivotally mounted within the housing by means of a threaded pipe-flange 44 which is brazed or welded to the central portion of the rear wall 35 of the box on its inner surface, this flange receiving the threaded end of the pipe or shaft 33 which is passed through the aperture 32. A washer 45 and nuts 46 interlocking are then passed over the outer end of the shaft and tightened in such manner as to allow free rotation of the box.

Within the light box, as best shown in Fig. 2, a light source is provided by means of a circular fluorescent light assembly, the bulb 49 being secured to the rear wall 35 by means of spring clamps 47 which are brazed to the wall. Other types of appropriate light fixtures could be used. The conduit for the light assembly of course passes through the bore of the shaft 33 to a proper current source.

In order that rotation of the light box itself may be determined with other measurements for relative measurement, there is affixed to the upper end of the light box on its forward wall 36 a pointer 48 which registers with the scale 7 on the periphery of the opening 6 in the housing.

As previously stated, in the illustrated modification of the invention the apparatus is built to scale such that the light box is dimensioned to provide a screen of frosted glass 38 which is approximately 14 inches by 17 inches in size, to accommodate the standard X-ray film of that size. The use of such apparatus is quite simple. The operator merely inserts a film of the right size from the top behind the flanges 39 and over the face of the screen, allowing film of exact length to rest on the bottom of the bracket 43. By displacement of the pivoted bracket 43, the lower edge of a longer film, or the standard film if desired, is allowed to pass through the slots 41 and be received by the receptacle 40 at the lower end of the light box. Similarly, the upper edge, or overhang, of a film can pass through the like slot at the top of the box and be received by the corresponding receptacle.

Since a primary object of the invention, however, is to provide means for reading and measuring all standard sizes of film, further means for accommodation of very small film has been provided by means of a mask 50, which is illustrated more particularly by Figs. 6, 7, and 8 of the drawings. In the embodiment shown therein, the mask 50 is dimensioned to be approximately the same size as the face of the frosted glass screen 38. The mask is constructed of fiber board, plastic or other suitable material, and comprises a panel having beveled lateral edges 51 and is provided with a centrally disposed rectangular aperture 52. This aperture is formed, as shown in the drawings, with its vertical and lower edges 53 grooved on the back side of the panel to form corresponding shoulders 54 adapted to receive and hold the edges of a small size film.

The upper edge of the aperture is grooved or beveled inwardly, as can be most clearly seen in Figs. 6 and 7, to provide a recessed face 55, forming, with the projection of the upper ends of the vertical edges 53 of the opening, slots 56 through which the edges of a film may be inserted from above on the shoulders 54, the overlap of the face 55 serving to aid in retaining the upper edge of the film. With the mask inserted over the face of the screen 38 of the light box, a small size film is held in fixed position against the face of the box for reading.

It is to be understood that certain modifications may be made without departing from the scope of the invention, and that subcombinations and features of utility may be employed without reference to others, this being contemplated by and within the scope of the claims; therefore, the matter herein set forth in the specification and drawings is purely illustrative and not as limiting. Thus I claim:

1. In an apparatus for reading and measuring film images of the class having a vertical housing provided with a centrally disposed circular aperture, a frame mounted on the housing superposed over the aperture, means integral with the housing and frame for moving the frame laterally with respect to said aperture, a scale on said frame and a pointer on the housing registering with said scale for measuring displacement of the frame, a dial ring mounted on the frame movable in longitudinal adjustment thereon, a scale on said frame in register with a pointer on the ring for registering longitudinal displacement of the ring, a circular sight panel rotatably mounted on said ring having reference register marks, scale means on said ring in register with the reference marks on said sight panel for measuring rotation of the panel, the improvement which comprises in combination therewith a translucent light box rotatably mounted in said housing behind the circular aperture with means for rotating the light box coaxially relative to the center of the aperture, a pointer on the light box disposed in the aperture of the housing, scale means on the periphery of the aperture in register with said pointer for registering the degree of rotation of the light box, means for holding a film negative against the outer surface of the light box, integrally formed containers in the upper and lower ends of the light box having openings therein to receive the overhang of the film negative, and means within said light box providing light for transmission through the film negative.

2. The combination as in claim 1, wherein said means for holding a film negative against the outer surface of the light box comprises a pair of inwardly turned flanges on the lateral edges of said light box and a displaceable inwardly turned flange on the lower edge of said box.

3. The combination as in claim 1, wherein said means within said light box providing light for transmission through the film negative comprises an electric bulb affixed to the rearward wall of said box disposed to move with the rotation of said box providing constant intensity on the surface of said film.

4. In an apparatus for reading and measuring film images of the class having a vertical housing provided with a centrally disposed circular aperture, a vertical frame mounted on the housing superposed over the aperture and movable laterally on said housing with respect to said aperture, a scale on said frame and a pointer on said housing registering with the scale for measuring displacement of the frame, a dial ring mounted on the frame movable in longitudinal adjustment thereon, a scale on said frame in register with a pointer on the ring for registering longitudinal displacement of the ring, a circular sight panel rotatably mounted on said ring having reference register marks, scale means on said ring in register with the reference marks on said sight panel for measuring rotation of the panel, the improvement which comprises in combination therewith a vertically disposed light box pivotally mounted in said housing rotatable coaxially with the center of said aperture, said box having an aperture in the forward wall thereof, a translucent screen superposed over said aperture, a pair of longitudinal inwardly turned flanges on the edges of said aperture disposed to hold the lateral edges of said screen and a film negative against the outer surface of the screen, a horizontally disposed movable bracket mounted on the lower edge of said box provided with an upwardly turned forward flange disposed to receive and hold the lower edges of said screen and film negative and vertical arms at its extremities pivotally connected to the light box and movable rearwardly to disengage the lower edge of said film negative, integrally formed containers in the upper and lower ends of said light box having openings in the forward wall of said box disposed to receive the overhang of a film negative, and means within said light box providing light for transmission through the film negative.

5. Apparatus as described in claim 4, wherein said integrally formed containers comprise a pair of horizontally disposed cylinders of sufficient inside diameter to accommodate the natural roll of a relatively stiff film negative, said cylinders having their openings disposed to receive the edge of said film with minimal bending.

References Cited in the file of this patent

UNITED STATES PATENTS

| | | |
|---|---|---|
| 1,098,621 | Gist | June 2, 1914 |
| 1,350,042 | Stealy | Aug. 17, 1920 |
| 1,821,844 | McGrath | Sept. 1, 1931 |
| 1,860,772 | Dorion | May 31, 1932 |
| 2,008,567 | Simonton | July 16, 1935 |
| 2,110,087 | Kuhn | Mar. 1, 1938 |
| 2,164,655 | Kleerup | July 4, 1939 |
| 2,215,462 | Davidson | Sept. 24, 1940 |
| 2,354,183 | Crichton | July 25, 1944 |
| 2,529,052 | Sherwood | Nov. 7, 1950 |
| 2,588,803 | Coffey | Mar. 11, 1952 |
| 2,800,733 | Chevillon | July 30, 1957 |

FOREIGN PATENTS

| | | |
|---|---|---|
| 981,653 | France | Jan. 17, 1951 |